(12) United States Patent
Maruyama

(10) Patent No.: US 6,614,840 B1
(45) Date of Patent: Sep. 2, 2003

(54) EQUALIZER WITH PHASE-LOCKED LOOP

(75) Inventor: Hidenori Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,113

(22) Filed: Mar. 14, 2000

(30) Foreign Application Priority Data

Mar. 16, 1999 (JP) .......................................... 11-070406

(51) Int. Cl.[7] .......................... H03H 7/30; H03H 7/40; H03K 5/159
(52) U.S. Cl. ........................ 375/232; 375/229; 375/233; 375/376
(58) Field of Search ............................... 375/232, 233, 375/327, 341, 344, 376, 229

(56) References Cited

U.S. PATENT DOCUMENTS

| 6,134,280 A | * | 10/2000 | Matui .......................... 375/341 |
| 6,144,708 A | * | 11/2000 | Maruyama ................... 375/327 |
| 6,347,126 B1 | * | 2/2002 | Nagayasu et al. .......... 375/344 |

FOREIGN PATENT DOCUMENTS

| JP | 01272006 | 10/1989 |
| JP | 03221038 | 8/1991 |
| JP | 04039767 | 2/1992 |
| JP | 07030659 | 2/1995 |
| JP | 09135454 | 5/1997 |
| JP | 09158172 | 6/1997 |

* cited by examiner

*Primary Examiner*—Chi Pham
*Assistant Examiner*—Demetria Williams
(74) *Attorney, Agent, or Firm*—Whitham, Curtis & Christofferson, P.C.

(57) ABSTRACT

An equalizer with a phase-locked loop comprising: a phase rotator which rotates a phase of a received signal to output a rotated signal; an impulse response detector which detects impulse responses of a transmission line through which the received signal has been transmitted on the basis of the rotated signal; a first region designator which designates a first region on the basis of the impulse responses; a second region designator which designates a second region on the basis of the impulse responses; an equalizer which estimates a sequence on the basis of the rotated signal by using the impulse responses in the first region; a replica generator which generates a replica of the received signal on the basis of the sequence by using the impulse responses in the second region; a phase detector which detects a phase difference between the replica and the rotated signal; and a circuit for controlling the phase rotator on the basis of the phase difference to decrease the phase difference.

6 Claims, 4 Drawing Sheets

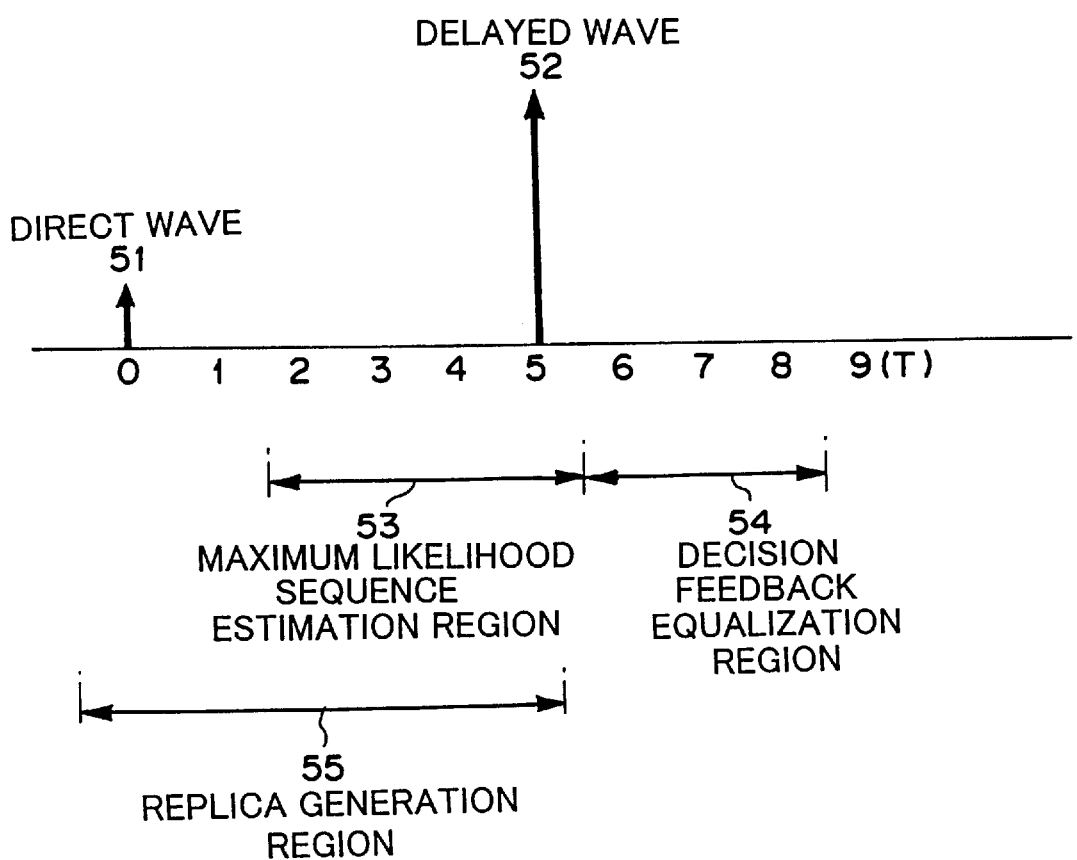
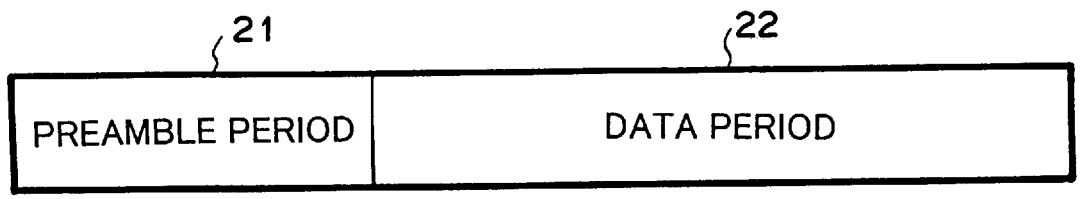

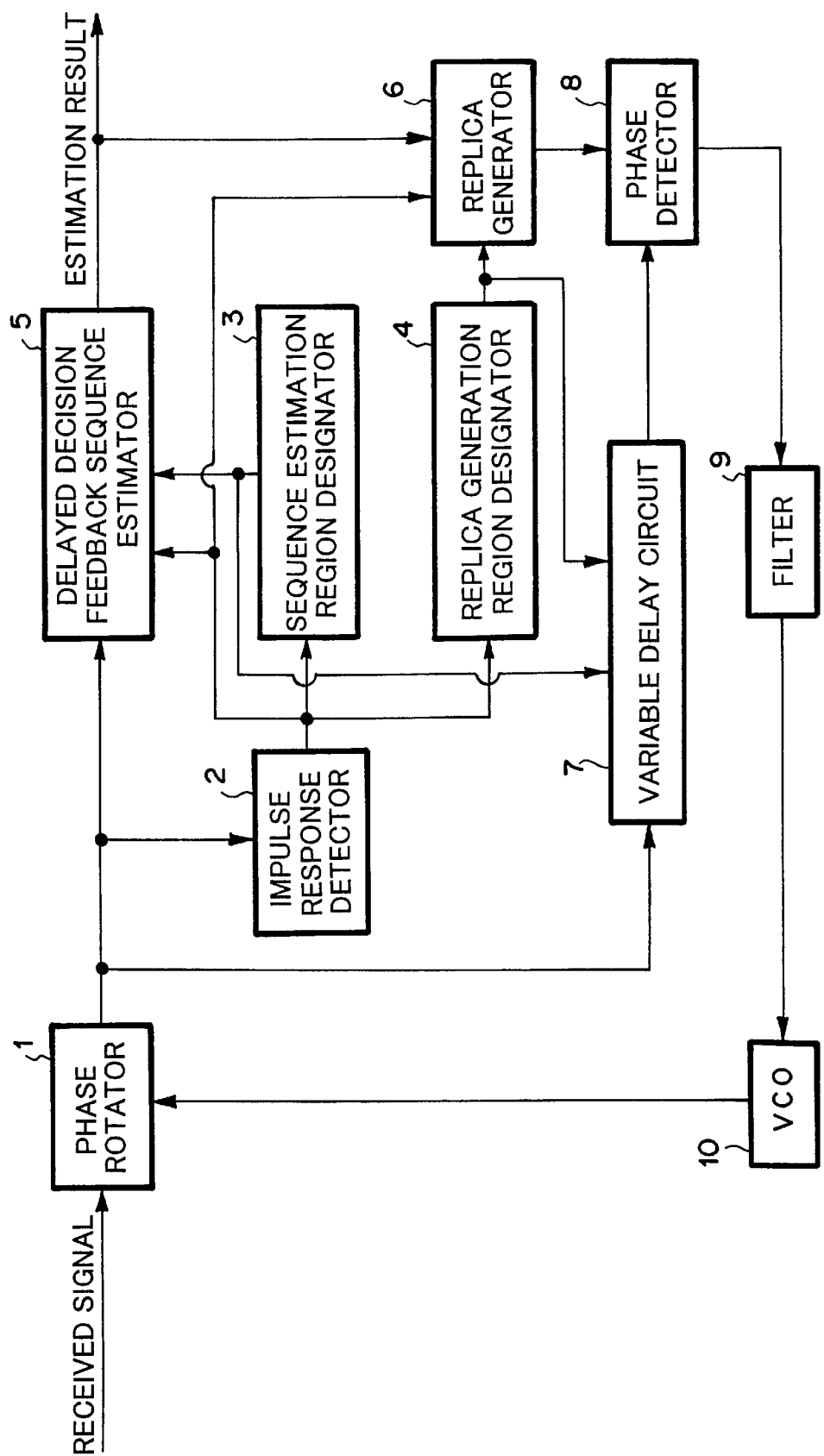

EQUALIZER WITH PHASE-LOCKED LOOP

BACKGROUND OF THE INVENTION

1. Field of the Invention

The present invention relates to an equalizer with a phase-locked loop which detects and eliminates a phase shift from a received signal which is subjected to a frequency offset or a phase variation generated at the beginning of a burst transmission and more particularly, to a delayed decision feedback sequence estimator with a phase-locked loop which can compensate a phase shift of a received signal which is terribly deteriorated by a transmission distortion.

2. Description of the Prior Art

A delayed decision feedback sequence estimation receiver as a first prior art which has been disclosed in JPA 11-8573 is shown in FIG. 1.

Referring to FIG. 1, transmission line characteristic detector 41 detects discrete impulse responses from a received signal in a preamble, i.e. a training signal of an M-sequence. Absolute value calculator 42 calculates an amplitude of each impulse response. Accumulator 43 sets three regions, i.e. a maximum likelihood sequence estimation region, a decision feedback equalization region, and a non-estimation region, and obtains a sum $p$ of amplitudes of impulse responses in the maximum likelihood sequence estimation region, a sum $q$ of amplitudes of impulse responses in the decision feedback equalization region, and a sum $r$ of amplitudes of impulse responses in the non-estimation region each time an amplitude of a succeeding impulse response is inputted. Maximum detector 44 calculates a value of $p/(r+\alpha q)$ for each impulse response group among shifted groups and outputs a signal which indicates the impulse response group which maximize the value. Delayed decision feedback sequence estimator 45 estimates the maximum likelihood sequence from the received signal by using the impulse responses selected from the impulse responses inputted from transmission line characteristic detector 41 by the signal from maximum detector 44.

Next, the calculation in maximum detector 44 which determines the optimum regions of impulse responses will be explained. Components in the decision feedback equalization region are ideally cancelled by feedback and do not contribute to improvement or deterioration of the estimation capability of delayed decision feedback sequence estimator 45. Therefore, the estimation capability is determined by the ratio of $p/r$, i.e. the ratio of the sum $p$ of amplitudes of impulse responses in the maximum likelihood sequence estimation region and the sum $r$ of amplitudes of impulse responses in the non-estimation region, and the greater the ratio of $p/r$, the higher the estimation capability.

However, because of quantization errors and the like, components in the decision feedback equalization region are not canceled completely and remain as a distortion. Therefore, the greater the ratio of $p/(r+\alpha q)$, i.e. the ratio of the sum $r$ of amplitudes of impulse responses in the maximum likelihood sequence estimation region and the sum of the sum $r$ of amplitudes of impulse responses in the non-estimation region and the weighted sum $\alpha q$ of amplitudes of impulse responses in the decision feedback equalization region, the higher the estimation capability. That is, the impulse response group which maximizes the ratio of $p/(r+\alpha q)$ indicates the optimum regions.

A phase-locked loop circuit using equalizer as a second prior art which as been disclosed in JPA 10-327204 is shown in FIG. 2.

Impulse response detector 33 is similar to transmission line characteristic detector 41 of the first prior art. Delayed decision feedback sequence estimator 32 is similar to delayed decision feedback sequence estimator 45 of the first prior art. Region designator 34 is similar to a group of absolute value calculator 42, accumulator 43, and maximum detector 44, each of which is of the prior art. Replica generator 35 convolutes impulse responses designated by region designator 34 among impulse responses of a transmission line obtained by impulse response detector 33 in a preamble period with a sequence signal estimated in delayed decision feedback sequence estimator 32 in order to generate a replica of a received signal. Delay circuit 36 delays the received signal which has been rotated in phase in phase rotator 31 to compensate the delay which is generated in delayed decision feedback sequence estimator 32. Thus, an output from delay circuit 36 coincides with an output from replica generator 35. Phase detector 37 detects a phase difference between the output from replica generator 35 and the output from delay circuit 36. Here, if the received signal has a frequency offset, the phase difference between the transmission side and the reception side varies with a laps of time, and the phase difference detected by phase detector 37 varies with a laps of time. That is, because replica generator 35 outputs a signal with no phase variation as long as delayed decision feedback sequence estimator 32 does not cause errors as the impulse response of a transmission line used in replica generator 35 is constant, while delay circuit 36 outputs a signal with a phase variation, phase detector 37 detects a phase difference between the signals.

An output signal from phase detector 37 is in bandwidth restricted by filter 38 and inputted to VCO (Voltage Controlled Oscillator) 39. Phase rotator 31 rotates a phase of a received signal by using an output of VCO 39 to reduce the phase difference detected by phase detector 37, thereby absorbing a phase variation due to a frequency offset or the like.

The second prior art has a disadvantage that a replica generated in replica generator 35 may deteriorate in precision for some impulse responses of a transmission line. This disadvantage when a delayed decision feedback sequence estimator is used as a signal estimator will be explained below.

FIG. 3 shows an example of an impulse response and regions. In this example, the symbol length of maximum likelihood sequence estimation region 53 is 4, and the symbol length of decision feedback equalization region 54 is 3. There are direct wave 51 and delayed wave 52 delayed from direct wave by 5T (T: symbol period), thereby constituting a two-wave model. In practical circumstances, there is a case that a level of direct wave 51 is extremely lowered because of fading. In such a case, as a result of calculation of regions as explained above, maximum likelihood sequence estimation region 53 includes a delayed wave 52 and both of maximum likelihood sequence estimation region 53 and a decision feedback equalization region 54 do not include direct wave 51.

A delayed decision feedback sequence estimator has such a feature that a maximum likelihood sequence estimation region and a decision feedback equalization region 53 are determined in such a way that a direct wave or one or more delayed waves are not included in both of a maximum likelihood sequence estimation region and a decision feedback equalization region though the direct wave and all the delayed waves may be included in any of maximum likelihood sequence estimation region 53 and decision feedback equalization region 54.

Delayed decision feedback sequence estimator 32 obtains a better estimation characteristics when executing a maximum likelihood estimation using a delayed wave high in level than using a direct wave low in level as shown in FIG. 3. However, when obtaining a phase difference between a replica and a received signal, the replica does not include a direct wave which falls out of a maximum likelihood sequence estimation region and out of a decision feedback equalization region. Therefore, the phase difference includes an error composed of the direct wave. This error is not caused by a phase variation but the error is fedback to phase rotator 31 as if there is a phase variation, thereby deteriorating a estimation characteristics.

SUMMARY OF THE INVENTION

In order to overcome the aforementioned disadvantages, the present invention has been made and accordingly, has an object to improve estimation characteristics in an equalizer, especially a delayed decision feedback sequence estimator, by operating in high-accuracy a phase-locked loop which compensates a phase variation due to a frequency offset or the like and is included in a receiver which estimates a signal on the basis of a received signal which has been extremely distorted in a transmission line by using the equalizer.

According to an aspect of the present invention, there is provided an equalizer with a phase-locked loop comprising: a phase rotator which rotates a phase of a received signal to output a rotated signal; an impulse response detector which detects impulse responses of a transmission line through which the received signal has been transmitted on the basis of the rotated signal; a first region designator which designates a first region on the basis of the impulse responses; a second region designator which designates a second region on the basis of the impulse responses; an equalizer which estimates a sequence on the basis of the rotated signal by using the impulse responses in the first region; a replica generator which generates a replica of the received signal on the basis of the sequence by using the impulse responses in the second region; a phase detector which detects a phase difference between the replica and the rotated signal; and means for controlling the phase rotator on the basis of the phase difference to decrease the phase difference.

The equalizer with a phase-locked loop may further comprise: a variable delay circuit which delays the rotated signal to be supplied to the phase detector by a period determined by the first region and the second region.

The equalizer may be a delayed decision feedback sequence estimator; and the first region may be divided into a third region and a four region.

The third region and the four region may maximize $P/(R+\alpha Q)$, wherein P stands for a sum of powers of the impulse responses in the third region, Q stands for a sum of powers of the impulse responses in the fourth region, R stands for a sum of powers of the impulse responses in a region other than the third and fourth regions, and $\alpha$ stands for a coefficient.

The second region may maximize $(P+Q)/R$, wherein P stands for a sum of powers of the impulse responses in the third region, Q stands for a sum of powers of the impulse responses in the fourth region, and R stands for a sum of powers of the impulse responses in a region other than the third and fourth regions.

The impulse response detector may detect the impulse responses on the basis of the rotated signal in a preamble.

The means for controlling may comprise: a filter which restricts a bandwidth of the phase difference; and a voltage controlled oscillator which generates a sinusoidal wave to be supplied to the phase rotator in response to the phase difference restricted in bandwidth.

These and other objects, features and advantages of the present invention will become more apparent in the light of the following detailed description of the best mode embodiments thereof, as illustrated in the accompanying drawings.

BRIEF DESCRIPTION OF THE DRAWINGS

FIG. 3 is a timing chart showing impulse responses and regions used by delayed decision feedback sequence estimator and replica generator;

FIG. 4 is a block diagram showing an embodiment of an equalizer with a phase-locked loop according to the present invention; and FIG. 5 is a diagram showing a format of a signal received by an equalizer with a phase-locked loop.

DETAILED DESCRIPTION OF THE PREFERRED EMBODIMENT

Figure 1:
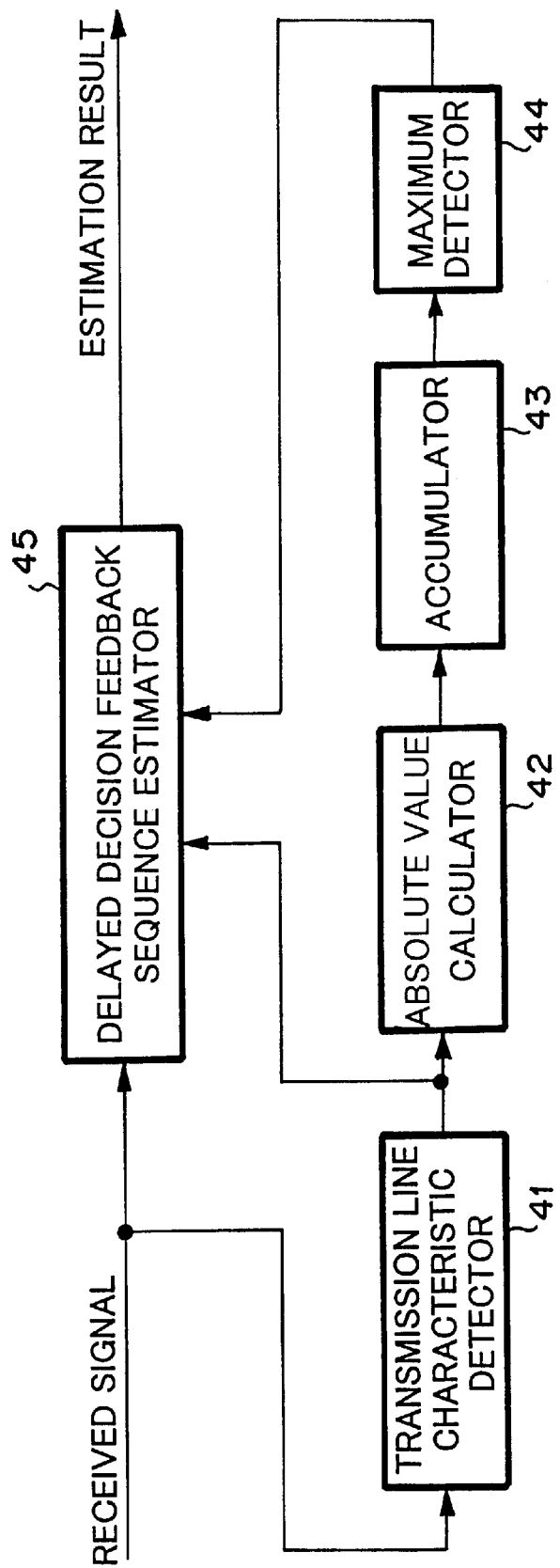
FIG. 1 is a block diagram showing a delayed decision feedback sequence estimation receiver as the first prior art.
Figure 2:
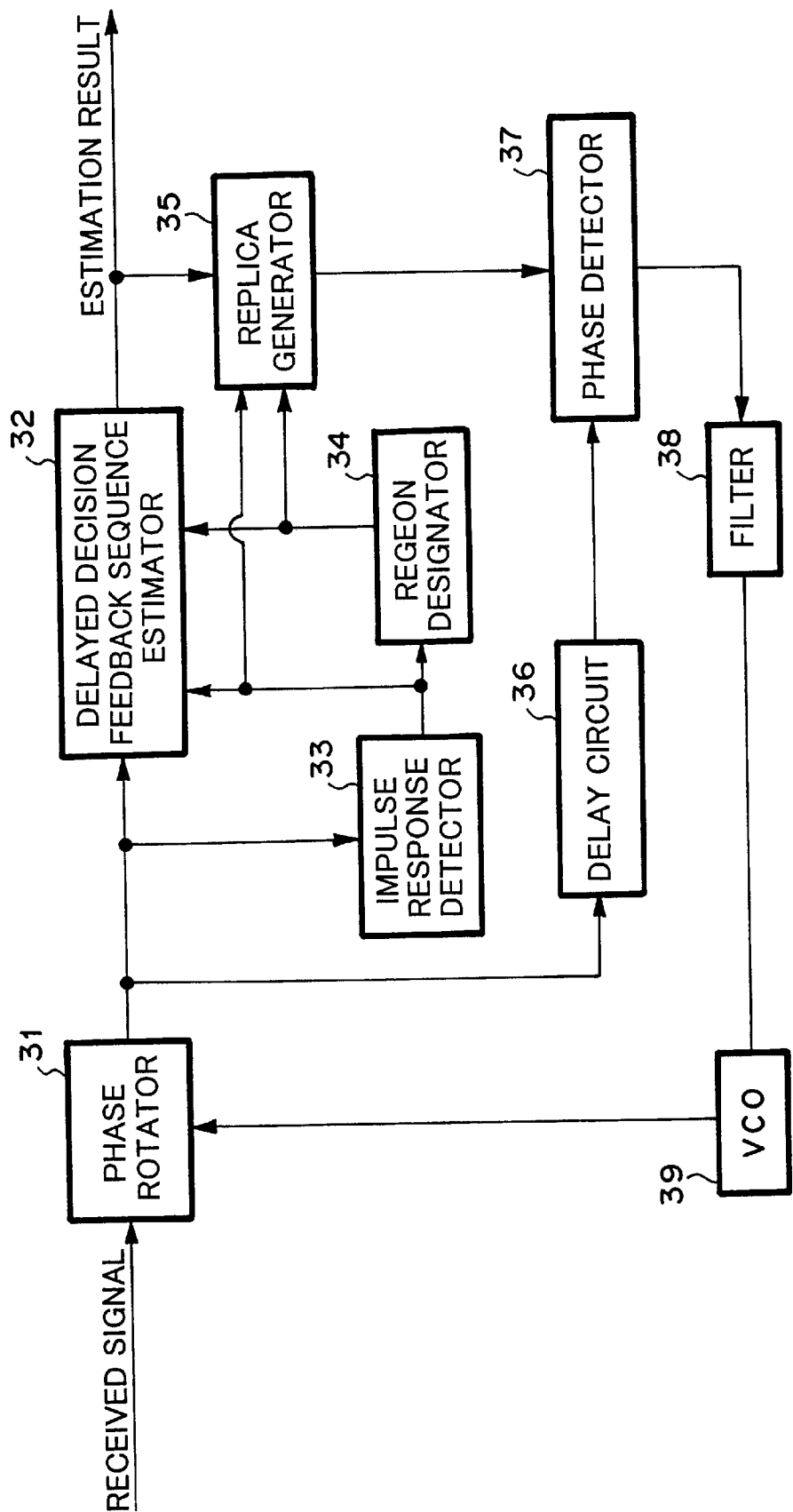
FIG. 2 is a block diagram showing an equalizer with a phase-locked loop as the second prior art.

Preferred modes of embodiment according to the present invention will be described with reference to the accompanying drawings.

FIG. 4 shows a structure of an embodiment of an equalizer with a phase-locked loop.

The equalizer with the phase-locked loop comprises: a phase rotator 1 which rotates a phase of a received signal by an angle designated by VCO 10; impulse response detector 2 which detects impulse responses of a transmission line from a test signal in a preamble such as an M-sequence; sequence estimation region designator 3 which designates regions, i.e. maximum likelihood sequence estimation region 53 and decision feedback equalization region 54 in FIG. 3, in which impulse responses for estimating a sequence are included replica generation region designator 4 which designates a region, i.e. replica generation 55 in FIG.3, in which impulse responses for generating a replica are included; delayed decision feedback sequence estimator 45 which estimates a sequence on the basis of the received signal which has been rotated in phase by using impulse responses in the regions designated by sequence estimation region designator 3 among impulse responses inputted from impulse detector 2; replica generator 6 which convolutes a sequence estimated in delayed decision feedback sequence estimator 5 with impulse responses in the region designated by replica generation region designator 4 among impulse responses inputted from impulse response detector 2 in order to generate a replica of the received signal from which a phase variation is removed; variable delay circuit 7 which delays an output of phase rotator 1 by a period determined by a time difference from the replica generation period to the maximum likelihood sequence estimation region; phase detector 8 which detects a phase difference between an output from replica generator 6 and an output from variable delay 7; filter 9 which restricts the bandwidth of an output from phase detector 8; and VCO 10 which outputs a sinusoidal wave which is proportional to an output of filter 9.

Impulse response detector 2, sequence estimation region designator 3, and delayed decision feedback sequence estimator 5 constitute an equalizer similar to the first prior art. Sequence estimation region designator 4 is similar to region designator 34 of the second prior art. Delayed decision feedback sequence estimator 5 is composed of a maximum likelihood sequence estimator and a decision feedback estimator.

Next, the operation of the equalizer with the phase-locked loop as shown in FIG. 1 will be explained.

In preamble period 21 as shown in FIG. 5, impulse response detector 2 detects impulse responses. Impulse response detector 2 has a function similar to transmission line characteristic detector 41 in FIG. 1 and performs a calculation regarding a correlation between the output from phase rotator 1 and a sequence already known to obtain impulse responses.

Sequence estimation region designator 3 determines maximum likelihood sequence estimation region 53 and decision feedback equalization region 54 for sequence estimation. Replica generation region designator 4 determines replica generation region 56 for generating a replica.

Maximum likelihood sequence estimation region 53 and decision feedback equalization region 54 are determined in the same manner as the first prior art. That is, they are determined to maximize $P/(R+\alpha Q)$, where P stands for a power in maximum likelihood sequence estimation region 53, Q stands for a power in decision feedback equalization region 54, R stands for a power in a non-estimation region, and $\alpha$ stands for a coefficient.

Replica generation region 56 is determined to maximize a power in replica generation region 56, i.e. $(P+Q)/R$, where P stands for power in maximum likelihood sequence estimation region 53, Q stands for a power in decision feedback equalization region 54, and R stands for a power in a non-estimation region.

The lengths of maximum likelihood sequence estimation region 53, decision feedback equalization region 54, and replica generation region 56 are predetermined.

There may be a case where a group of maximum likelihood sequence estimation region 53 and decision feedback equalization region 54 is the same as replica generation region 56 provided that the sum of the length of maximum likelihood sequence estimation region 53 and the length of decision feedback equalization region 54 is the same as the length of replica generation region 56.

FIG. 3 shows a case the lengths of maximum likelihood sequence estimation region 53, decision feedback equalization region 54, and replica generation region 56 are 4, 5, and 6, respectively, and impulse responses are direct wave 51 and delayed wave 52.

A delay in delay circuit 7 is introduced to cancel a time difference between the output from phase rotator 1 and the replica which has been delayed because of a process time for estimation in delayed decision feedback sequence estimator 5.

Moreover, in case replica generation period 56 precedes a group of maximum likelihood sequence estimation region 53 and decision feedback equalization region 54, it is necessary to increase the delay because it is necessary to use a result of estimation in future to generate a replica. Variable delay circuit 7 adjusts the delay of the output from phase rotator 1 in accordance with a time difference between replica generation period 56 and the group of maximum likelihood sequence estimation region 53 and decision feedback equalization region 54.

Phase detector 8 detects a phase difference between the output from replica generator 6 and the output from variable delay 7. The signal representing the phase difference is restricted in bandwidth by filter 9 and inputted to VCO 10 which generates a sinusoidal wave, frequency of which is proportional to the input signal. The sinusoidal wave is inputted to phase rotator 1 to reduce the phase difference detected in phase detector 8.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. An equalizer with a phase-locked loop comprising:

a phase rotator which rotates a phase of a received signal to output a rotated signal;

an impulse response detector which detects impulse responses of a transmission line through which the received signal has been transmitted on the basis of said rotated signal;

a first region designator which designates a first region on the basis of said impulse responses;

a second region designator which designates a second region on the basis of said impulse responses;

an equalizer which estimates a sequence on the basis of said rotated signal by using said impulse responses in said first region;

a replica generator which generates a replica of the received signal on the basis of said sequence by using said impulse responses in said second region;

a phase detector which detects a phase difference between said replica and said rotated signal;

a variable delay circuit which delays said rotated signal to be supplied to said phase detector by a period determined by said first region and said second region; and means for controlling said phase rotator on the basis of said phase difference to decrease said phase difference.

2. The equalizer with a phase-locked loop according to claim 1, wherein said equalizer is a delayed decision feedback sequence estimator; and wherein said first region is divided into a third region and a four region.

3. The equalizer with a phase-locked loop according to claim 2, wherein said third region and said four region maximize $P/(R+\alpha Q)$, wherein P stands for a sum of powers of said impulse responses in said third region, Q stands for a sum of powers of said impulse responses in said fourth region, R stands for a sum of powers of said impulse responses in a region other than said third and fourth regions, and $\alpha$ stands for a coefficient.

4. The equalizer with a phase-locked loop according to claim 2, wherein said second region maximizes $(P+Q)/R$, wherein P stands for a sum of powers of said impulse responses in said third region, Q stands for a sum of powers of said impulse responses in said fourth region, and R stands for a sum of powers of said impulse responses in a region other than said third and fourth regions.

5. The equalizer with a phase-locked loop according to claim 1, wherein said impulse response detector detects said impulse responses on the basis of said rotated signal in a preamble.

6. The equalizer with a phase-locked loop according to claim 1, wherein said means for controlling comprises: a filter which restricts a bandwidth of said phase difference; and a voltage controlled oscillator which generates a sinusoidal wave to be supplied to said phase rotator in response to said phase difference restricted in bandwidth.

* * * * *